United States Patent
Klink

[19]

[11] Patent Number: 5,374,962
[45] Date of Patent: Dec. 20, 1994

[54] MULTI-STANDARD TV RECEIVER WITH LUMA/CHROMA DELAY COMPENSATION

[75] Inventor: Kristopher A. Klink, Fishers, Ind.

[73] Assignee: Thomson Consumer Electronics, Inc., Indianapolis, Ind.

[21] Appl. No.: 221,312

[22] Filed: Mar. 30, 1994

[51] Int. Cl.$^5$ .............................................. H04N 5/46
[52] U.S. Cl. ..................................... 348/557; 348/555
[58] Field of Search ............... 348/557, 558, 555, 556, 348/914, 453; H04N 5/46

[56] References Cited

U.S. PATENT DOCUMENTS

| | | |
|---|---|---|
| 4,278,994 | 7/1981 | Van der Valk . |
| 4,309,719 | 1/1982 | Hinn . |
| 4,472,731 | 9/1984 | van Gurp et al. . |
| 4,661,844 | 4/1987 | Rufray et al. ........................ 348/557 |
| 4,766,484 | 8/1988 | Clayton ................................ 348/557 |
| 5,119,177 | 6/1992 | Lim ..................................... 348/557 |

*Primary Examiner*—Victor R. Kostak
*Attorney, Agent, or Firm*—Joseph S. Tripoli; Peter M. Emanuel; Richard G. Coalter

[57] ABSTRACT

A composite video input signal is delayed by a delay element and the delayed composite signal is applied to luminance and chrominance inputs of a picture processor for received signals of an NTSC format. For received signals of a PAL format, the delayed composite signal is applied only to the luminance input of the picture processor and the chrominance component of the received signal is transcoded to the NTSC format and applied, without passing through the composite signal delay element, to the chrominance input of the picture processor. The delay of the delay element for the composite video signal is selected to be equal to the transcoding delay whereby luminance and chrominance components of received signals of either NTSC or PAL format are delay compensated. Advantageously, the delay applied to the luminance component is constant and of the same value for signals of either format and so there is no need for switching of delay elements in the luminance path when changing from one format to the other and so undesirable switching artifacts (e.g., DC offset or transient effects) are avoided.

10 Claims, 5 Drawing Sheets

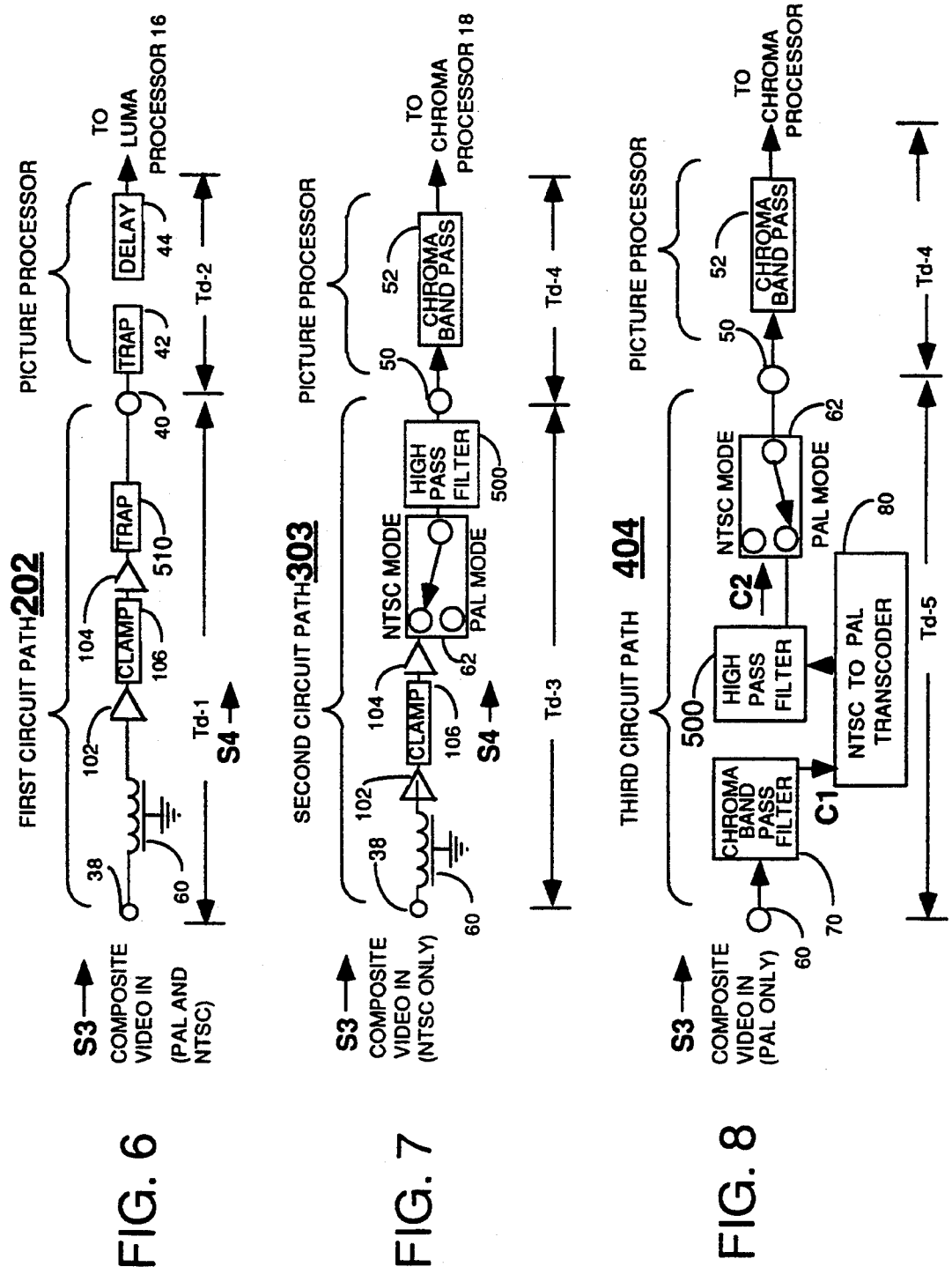

MULTI-STANDARD TV RECEIVER WITH LUMA/CHROMA DELAY COMPENSATION

FIELD OF THE INVENTION

This invention relates to television receivers generally and particularly to multi-standard television receivers for receiving and displaying signals encoded in two or more standard video signal transmission formats.

BACKGROUND OF THE INVENTION

Multi-mode television receivers capable of reception and display of television signals of different transmission standards are known. Hinn, for example, describes a two-mode receiver for signals of PAL or SECAM format in U.S. Pat. No. 4,309,719. An example of three mode receiver processing for NTSC, PAL-M and PAL-N is described by Lim in U.S. Pat. No. 5,119,177.

It is conventional practice in multi-standard receivers to alter the display scan rate to match that of the received signal and to transcode the received chrominance signal to a common color standard. Advantageously, this simplifies later color processing steps such as hue and saturation control, flesh-tone correction and the like.

The use of a chrominance signal transcoder for converting received color signals to a common standard may present a problem with regard to providing proper registration between the received luminance and chrominance components for different transmission standards. Specifically, transcoding of the chrominance signal introduces a processing delay. To maintain proper registration of the luminance and chrominance signals in different operating modes, it is desirable that additional delay be inserted in the luminance signal path when the received signal requires transcoding to compensate for the transcoding delay imparted to the chrominance signal by the transcoder. If some form of delay compensation is not provided, visual artifacts (e.g., color errors) may be produced when switching between video signals of different transmission standards.

The problem of delay compensation in multi-mode receivers is recognized in the above-mentioned Hinn patent where it is noted that one possible solution to the problem would be to provide a compensating delay of a fixed "compromise" value (e.g., lying midway between the delays required in each video transmission standard). Hinn points out, however, that in cases where the delay difference is relatively large (e.g., 500 nanoseconds) that reliance on a compensating delay of a fixed "compromise" value may provide unsatisfactory results.

A solution to the problem of color registration in multistandard receivers, proposed by Hinn, is to provide a switchable delay in the luminance signal channel. Advantageously, this completely avoids any potential errors due to the use of fixed "compromise" delay compensation values and provides exact delay compensation for any transmission format of the video signal. More specifically, in the Hinn system, a switch adds extra delay to the luminance signal path when receiving signals that require chrominance transcoding from one standard to another (e.g., SECAM to PAL in the Hinn system). For signals of a format that does not require transcoding (e.g., PAL in the Hinn system), the delay is switched out of the luminance path. Advantageously, this method of delay compensation avoids the inaccuracies of "compromise" delays and ensures that the luminance and chrominance signals receive equal delays regardless of the format (PAL or SECAM) of the received signal.

SUMMARY OF THE INVENTION

The present invention resides, in part, in the recognition that a need exists for a multi-standard television receiver providing proper luminance/chrominance signal registration but without requiring the switching of registration compensation delay devices in the luminance signal path of the receiver when changing from reception of signals one transmission standard to signals of a different transmission standard.

Advantageously, providing luma/chroma delay compensation without subjecting the luminance signal to switching has a number of beneficial effects. For example, one advantage is elimination of a potential for switch offset voltage to alter the DC level of the luminance signal which otherwise could produce undesirable visual artifacts (e.g., brightness changes) when switching between modes. Also, undesirable switching effects such as feed through and switching transients are eliminated. Other advantages include, illustratively, improved reliability (due to reduced component count) and reduced cost.

In a multi-standard television receiver embodying the invention, a composite video input signal is delayed by a delay element and the delayed composite signal is applied to luminance and chrominance inputs of a picture processor for received signals of a first transmission standard. For received signals of a second transmission standard, the delayed composite signal is applied only to the luminance input of the picture processor and the chrominance component of the received signal is transcoded to the first transmission standard and applied, without passing through the composite signal delay element, to the chrominance input of the picture processor. The delay of the delay element is selected to be substantially equal to the transcoding delay whereby luminance and chrominance components of received signals of either transmission format are delay compensated without requiring switching of the luminance component when changing from one format to another.

A method, embodying the invention, for providing delay compensation in a multi-standard television receiver has application to receivers of a type including a picture processor having respective inputs for receiving luminance and chrominance input signals of a first transmission format and having an output for providing a processed signal for display, the receiver including a transcoder for converting the color component of received signals of a second format to the first format and a switching system for enabling the transcoder for received signals of the second format and for bypassing the transcoder for received signals of the first format.

In accordance with the method of the invention, to avoid subjecting the luminance signal to varying delay when changing between received signals of a first standard transmission format and a second standard transmission format, the method comprises the steps of applying the received composite video signal to the luminance input of the picture processor via a first circuit path including a composite video signal delay unit for received signals of both of the standard transmission formats. The received composite video signal is applied to the chrominance input of the picture processor via a second circuit path including the composite video signal delay unit and a chrominance signal selection switch when the received signal is of the first standard transmission format. The received composite video signal is applied to the chrominance input of the picture processor via a third circuit path including a chrominance signal transmissive filter, a chrominance signal transcoder and the chrominance signal selection switch when the received signal is of said second standard transmission format.

A multi-standard television receiver, embodying the invention, comprises a picture processor having respective inputs for receiving luminance and chrominance input signals of a first transmission format and having an output for providing a processed signal for display, the receiver including a transcoder for converting the color component of received signals of a second format to the first format and a switching system for enabling the transcoder for received signals of the second format and for bypassing the transcoder for received signals of the first format.

The receiver is characterized in that, for providing delay compensation of the luminance and chrominance input signals the switching system comprises first, second and third circuit paths. The first circuit path (202) applies the received composite video signal to the luminance input (40) of the picture processor (10) via a composite video signal delay unit (60) for received signals of both of said standard transmission formats. The second circuit path (303) applies the received composite video signal to the chrominance input (50) of the picture processor (10) via the composite video signal delay unit (60) and a chrominance signal selection switch (62) when the received signal is of the first standard transmission format; and the third circuit path (404) applies the received composite video signal to the chrominance input (50) of the picture processor via a chrominance signal transmissive filter (70), a chrominance signal transcoder (80) and the chrominance signal selection switch (62) when the received signal is of said second standard transmission format.

BRIEF DESCRIPTION OF THE DRAWING

The foregoing and further features of the invention are illustrated in the accompanying drawing, wherein like elements are denoted by like reference designators and in which:

FIGS. 6, 7 and 8 are simplified block diagrams illustrating relative signal delay times of first, second and third circuit paths in the receiver of FIG. 5.

DETAILED DESCRIPTION

Figure 1:
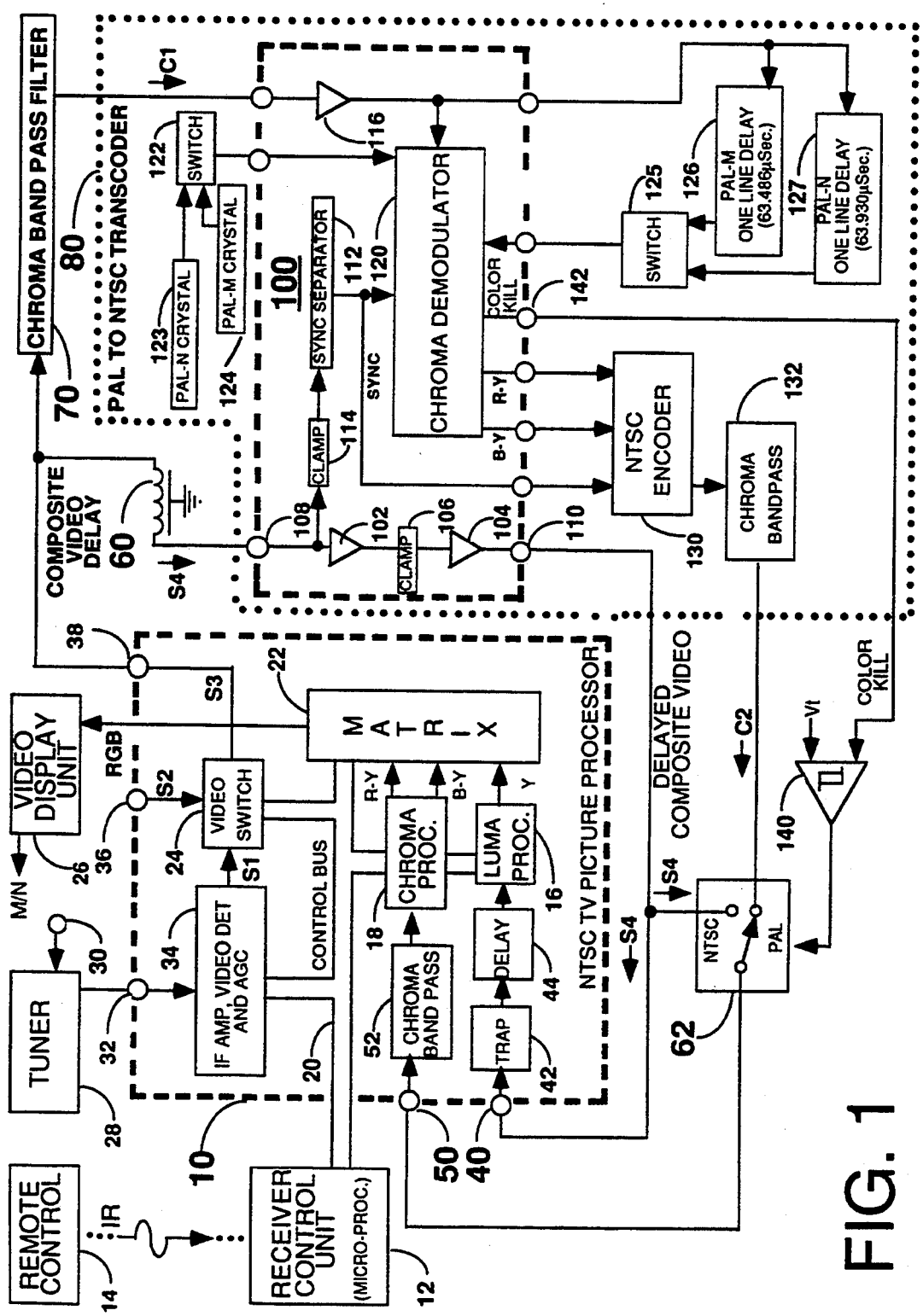
FIG. 1 is a block diagram, partially in schematic form, of a multi-standard television receiver embodying the invention.

The multi-mode television receiver of FIG. 1 provides receiving modes for NTSC, PAL-M and PAL-N format video signals. Other transmission formats may be accommodated, such as SECAM, by selecting an appropriate chrominance signal transcoder as will be explained.

As used herein the suffixes "M" and "N" correspond to the CCIR recommendation 470-1 for designations of scanning parameters. Briefly, the letter "M" designates a 525-line/60-field, 4.2 MHz bandwidth, 4.5 MHz sound carrier monochrome system. The letter "N" designates a 625-line/50-field, 4.2 MHz bandwidth, 4.5 MHz sound carrier monochrome system. The designations NTSC and PAL refer to the method of color transmission and, specifically, whether or not the subcarrier phase is altered from line to line (as in PAL) or is constant from line to line (as in NTSC). The NTSC (M) system is used in a number of countries in North and Central America. The PAL-M and PAL-N standards are used in some South American countries, such as Brazil and the Argentines, respectively.

The receiver of FIG. 1 includes an NTSC format television picture processor 10 (outlined in phantom). The function of processor 10 is to provide conventional picture processing functions such as chroma demodulation, hue and saturation control, brightness and contrast control, video peaking, RGB matrixing and the like. Integrated circuits are commercially available which provide such picture processing functions, an example being the type LA7610 NTSC standard processor manufactured by Sanyo.

The processing functions of TV picture processor 10 are controlled by a receiver control unit 12 (e.g., a micro-processor) which receives user commands directly or via a remote control unit 14 and applies the user commands to luminance 16 and chrominance 18 processors in the picture processor 10 via a control bus 20. Processor 16 provides functions such as brightness, contrast and peaking controls. Processor 18 provides functions, illustratively, of hue and saturation control. Bus 20 also supplies control signals to a matrix 22 and to a video signal selection switch 24 in processor 10. Switch 24 selects RF or baseband (auxiliary) video input signals for display. The matrix 22 receives the processed luminance and chrominance signals (Y, R-Y and B-Y) and supplies component RGB (red, blue and green) signals to a deflection and display unit 26. Unit 26 detects the field rate of the applied signal and scans at a 525-line 60-field rate for NTSC and PAL-M signals and at a 625-line 50-field rate for PAL-N signals). Alternatively, the display scan rate may be selected by the receiver control unit 12 under user control by the remote control unit 14, if desired.

Reception of RF signal sources is facilitated by a tuner 28 having an RF input connector 30 for connection to an antenna, cable or other suitable RF signal source and having an output coupled to supply intermediate frequency (IF) signals to an input terminal 32 of an IF amplifier, video detector and AGC unit 34 which is provided in the picture processor 10. Unit 34 amplifies the IF signal, demodulates it to baseband and provides AGC control of the baseband signal level to provide a baseband composite video output signal S1. Processor 10 also includes an auxiliary video input terminal 36 for receiving a video input signal S2 that is already of baseband composite video form. The signal source selection switch 24, under the control of bus 20, selects the composite video signals S1 or S2 and applies the selected composite video signal S3 to an output terminal 38 for further processing. This includes transcoding and delay compensation where the selected signal S3 is of a PAL format as will be explained.

TV picture processor 10 is designed, in its normal intended use, for processing video signals of the NTSC color standard and includes delay compensation for this standard. Specifically, in processor 10, the luminance input signal at input 40 is applied to the luminance signal processor 16 by means of a chrominance sisal trap circuit 42 and a compensating delay element 44. The delay of element 44 is adjustable by means of the control bus 20. In normal use of the picture processor 10, the delay of element 44 would be adjusted to compensate for differential luminance and chrominance signal delays in what ever signal separator is used for initially separating a composite video signal into its component parts together with delays contributed by the chrominance trap 42 and a chrominance bandpass filter 52 in processor 10.

In the receiver of FIG. 1, the delay of delay element 44 is set such that the luminance signal experiences a net delay (through delay 44 and trap 42) between terminal 40 and the input of processor 16 that is substantially equal to the delay of the chrominance signal band pass filter 52 which couples chrominance input signals at input 50 to the chrominance signal processor 18 in picture processor 10. Accordingly, with delay element 44 adjusted as described, luminance and chrominance signals that are temporally aligned at inputs 40 and 50 of TV picture processor 10 will also be temporally aligned when applied to respective inputs of the luminance and chrominance processors 16 and 18 of processor 10.

The remaining elements of the receiver of FIG. 1 provide transcoding for received signals of the PAL format and delay compensation to ensure temporal alignment of luminance and chrominance components applied to the inputs 40 and 50 of picture processor 10 regardless of what television format is being received and, importantly, without requiring any switching in the luminance signal path when changing from one television standard to another. Advantageously, as previously mentioned, this avoids potential problems such as changes in brightness level due to DC shifts in the switch offset and potential artifacts due, for example, to switching transients, switch control signal feed through, etc.

In more detail, for received signals of the NTSC format, the composite video signal S3 (selected by the video switch 24 in TV picture processor 10) is delayed by a delay element 60 and the delayed composite signal S4 is applied to luminance and chrominance inputs 40 and 50 of the picture processor 10. This is facilitated, in this example of the invention, by applying the delayed composite video signal S4 directly to the luminance input 40 of processor 10 and by applying the delayed composite video signal S4 to the chrominance input 50 of processor 10 via a mode control switch 62. This switch is closed, in the NTSC operating mode, to complete the circuit path for coupling the composite video signal S4 to the chrominance signal input of the picture processor 10. Conversely, in the PAL mode it is changed-over to couple a "de-switched" or NTSC format chrominance signal (obtained by transcoding of the PAL signal) to the chrominance input 50.

In this example of the invention, the delayed composite video signal S4 is subjected to some processing in addition to the delay imposed by delay element 60. Specifically, after being delayed, signal S4 is amplified and clamped in a PAL decoder circuit 100 (outlined in phantom) before being applied to the inputs of the picture processor 10. It is not essential that the composite signal pass through the decoder to receive buffering or clamping insofar as the NTSC operating mode is concerned since, for purposes of NTSC reception, the decoder is not used and one could by-pass the decoder in the NTSC mode. The particular decoder employed in the example of FIG. 1 (e.g., the type CXA 1218 manufactured by Sony), however, features amplifiers (102, 104) and a clamp 106 in a path between luminance input 108 and output 110 terminals. This path, normally intended for luminance signals in conventional applications of the decoder integrated circuit, is used in this example of the invention for amplification and clamping of the composite video signal S4 thereby simplifying the overall circuit.

As noted above, one may amplify the delayed composite video signal by either passing it though the decoder IC or by providing a separate amplifier and clamp circuit. For a given picture processor, it may be not necessary to provide amplification and clamping and, if so, such elements may be omitted. What is important, in so far as temporal registration of the luminance and chrominance signals is concerned, is that these signals receive equal delays. In the NTSC mode both the luminance and the chrominance signal, are of composite (i.e., combined) form and so when they are delayed by delay element 60 they are equally delayed and so have proper temporal registration when applied to the inputs 40 and 50 of the picture processor 10.

For received signals of a PAL format, switch 62 is changed over (to the position shown), and the delayed composite signal S4 is applied only to the luminance input 40 of the picture processor 10. The chrominance component C1 of the received signal S3 is separated from the un-delayed composite video signal S3 by means of a chrominance signal bandpass filter 70. The separated chrominance signal C1 is then transcoded by a PAL to NTSC transcoder 80 (outlined in phantom) to a chrominance signal C2 of the NTSC format and applied, without passing through the composite signal delay element 60, to the chrominance input 50 of the picture processor 10. The delay of the delay element 60 for the composite video signal is selected to be equal to the net transcoding delay (e.g., the delay of filter 70 plus the delay of transcoder 80). Accordingly, the luminance and chrominance components of received signals of PAL format are equally delayed when applied to the inputs of the picture processor 10.

In will be noted, from the two examples of operation noted above, that the delay applied to the luminance component by delay element 60 is constant and of the same value for signals of either format (NTSC or PAL) and so there is no need for switching of delay elements in the luminance path when changing from one format to the other. Advantageously, undesirable switching artifacts (e.g., DC offset or transient effects) are avoided.

Considering now the details of the PAL to NTSC transcoder 80, which is used in the PAL-M and PAL-N operating modes, the transcoder 80 includes a PAL decoder 100 (outlined in phantom) and an NTSC encoder 130 which are connected in cascade for demodulating PAL signals (M or N) to baseband (R-Y, B-Y) and remodulating the baseband signals to the NTSC chrominance subcarrier frequency. Integrated circuits suitable for use as decoder 100 and encoder 130 are the types CXA 1218 and CXA 1219 integrated circuit devices manufactured by Sony Corp. The PAL decoder integrated circuit 100 includes the luminance signal path previously mentioned (e.g., 102–110) which, in this embodiment of the invention provides amplification and clamping for the delayed composite video signal S4. For chroma demodulation, the integrated circuit includes a chroma demodulation section 120 which receives synchronizing signals from the delayed composite video signal S4 by means of sync detection and clamp circuits 112 and 114, respectively. The bandpass filtered chrominance signal C1 provided by filter 70 is amplified by amplifier 116 and applied to the chroma demodulator 120. The demodulator 120 includes a color oscillator which is set to operate at the PAL-M frequency or the PAL-N frequency by a switch 122 which selects the appropriate one of a PAL-N crystal 123 or a PAL-M crystal 124 for controlling the oscillator frequency.

Another switch 125 selects the appropriate one of one of two PAL one line (1-H) delay lines 126 and 127 which delay the video signal provided by amplifier 116 by one line in the PAL M and PAL-N standards. The 1-H delayed signals are used in demodulator 120 for separating the U and V components to facilitate subsequent "deswitching" of the "V" component and thus enabling demodulation to baseband R-Y and B-Y form. Switching of the delays allows for the difference in line periods in these two video standards, the PAL-N line period being about 444 $\mu$seconds longer than the PAL-M line period (e.g., 63,486 micro-seconds for PAL-M vs. 63.930 microseconds for PAL-N).

Control of the crystal switch 122 and the line delay switch 125 may be provided by the receiver control unit 12 in response to the user's choice of received signal. Automatic control is provided in this embodiment of the invention by the video display unit 26 which includes a field rate detector that provides a field rate indicating signal (identified as "M/N") for controlling switches 122 and 125 and the scan rate (deflection) of the display. This identification signal is referred to as the "M/N" signal because PAL signals of the "M" type are of a 525-line 60 Hz field rate (as is NTSC-M) whereas PAL signals of the "N" type have a 625-line 50 Hz field rate as previously noted. Thus, by detecting the field rate, the M and N signal formats are identified and switches 122 and 125 may be automatically controlled for selecting the appropriate crystal and line delay.

After conversion of the selected PAL signal to baseband, the sync signal provided by separator 112 and the baseband component color difference signals R-Y and B-Y are applied to the NTSC encoder integrated circuit 130 which re-modulates the chromiance signals on an NTSC standard color carrier. An integrated circuit suitable for this purpose is the Sony type CXA 1219. Desirably, modulation products falling outside the chrominance signal band are removed by means of a chrominance signal band-pass filter 132. This filter represents the principal source of transcoding delay in transcoder 80. The total transcoding delay, for PAL standard signals also includes the delay of band pass filter 70 which separates the chrominance signal C1 to be transcoded from the (non-delayed) composite video signal S3. To ensure equal delay for the luminance and chrominance components for PAL format signals, the delay of element 60 is selected to equal the overall transcoding delay. As to NTSC processing, the delay of unit 60 is not important since in this receiving mode the luminance and chrominance components both pass through it and so they are equally delayed.

The selection of PAL converted chrominance signals in the PAL mode is provided by switch 62. Recall that identification of PAL-M and NTSC is accomplished by detection of the field rate (60 Hz for NTSC and for PAL-M vs. 50 Hz for PAL-N). A different measure must be used to distinguish between PAL-M and NTSC since the scan rates are the same. In this example of the invention, identification PAL-M vs. NTSC is provided by a hysteresis threshold detector 140 that compares a color killer signal provided at terminal 142 of the PAL decoder 100 with a reference voltage Vt. The result of this comparison controls switch 62 to select the NTSC mode when the PAL decoder color killer indicates "no color" and to select the PAL mode otherwise. If this automatic selection is not desired in a given receiver application, the selection may, in the alternative, be made manually by receiver control unit 12 in response to user initiated commands from the receiver remote control unit 14.

Figure 2:
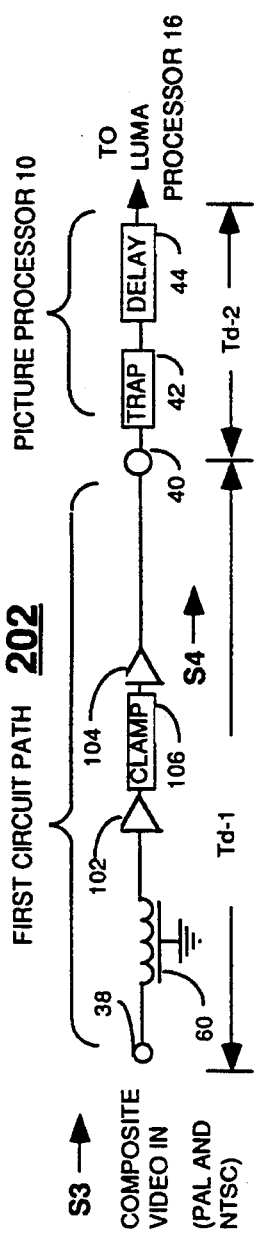
FIGS. 2, 3, and 4 are simplified block diagrams illustrating relative signal delay times of first, second and third circuit paths in the receiver of FIG. 1.
Figure 3:
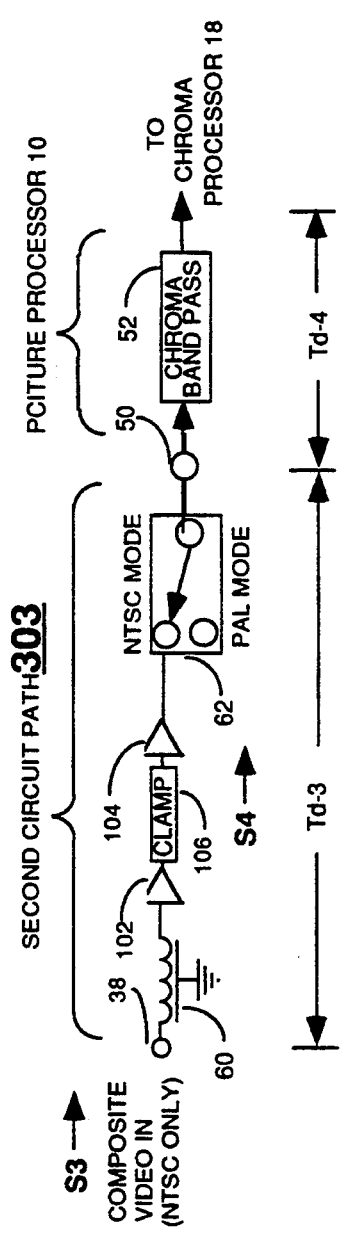
Figure 4:
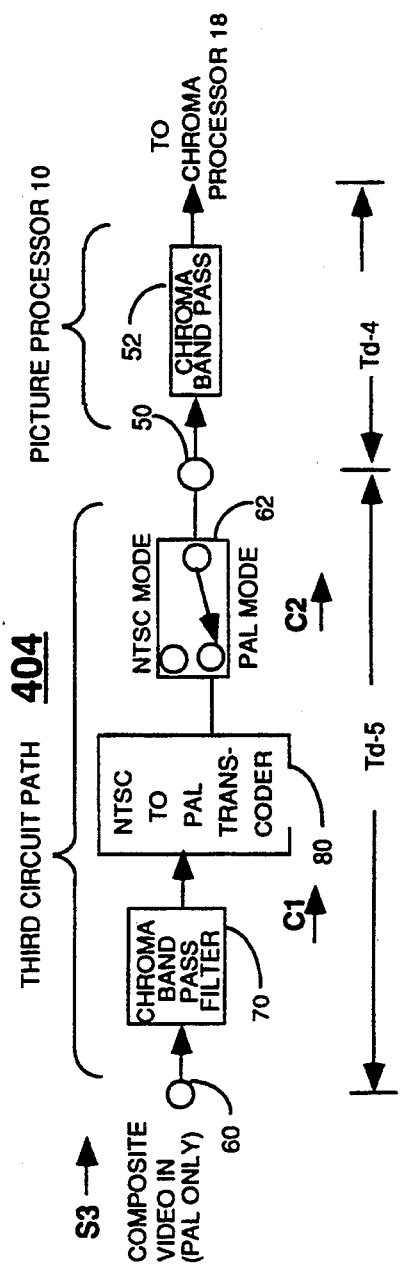

FIGS. 2, 3 and 4 illustrate timing relationships in three circuit paths used in the example of FIG. 1 for providing delay compensation to ensure proper luminance-chrominance signal temporal registration, without subjecting the luminance signal component of the received signal to switching when changing between the PAL and the NTSC operating modes.

FIG. 2 illustrates the delay of a first circuit path 202 for coupling the composite video signal to the luminance input of the picture processor. This path is employed in both the NTSC operating mode and in the two PAL operating modes. As shown, the composite video signal S3 provided at terminal 38 is coupled via delay 60 and the amplifiers and clamp 102-106 to the input 40 of the picture processor 10. Within processor 10, the luminance signal is coupled via a chrominance signal "trap" or "notch" filter 42 and a compensating delay 44 to the luminance signal processor 16. For purposes of illustration, the delay between terminals 38 and 40 will be referred to as time delay Td-1 and the delay between terminals 40 (the picture processor input) and the luminance processor 16 will be referred to as time delay Td-2.

In FIG. 3 it is seen that, for the NTSC mode only, the composite video signal S3 at terminal 38 is also delayed by line 60 and the delayed composite signal S4 is applied via the amplifiers and clamp circuits 102-106 and the switch 62 to the chrominance input of picture processor 10. This delay will be referred to as time delay Td-3. A chrominance signal band pass filter 52 separates the chrominance component from the delayed composite video signal S4 and passes it to the chrominance processor 18. The time delay of filter 52 is designated Td-4.

Temporal delay compensation for the NTSC mode is achieved by adjusting Td-2 to equal Td-4. Nothing more is required. This adjustment is facilitated by means of the receiver control unit 12 which may be used for setting the delay of unit 44 in picture processor 10. No further delay compensation is required in the NTSC mode because the delay of the first signal path 202 is substantially equal to that of the second signal path 303, i.e., Td-1=Td-3. This equality of delays results because the only different between these paths is the present of switch 62 and this switch introduces no substantial delay. Thus, for the NTSC mode it does not matter particularly what the delay of unit 60 may be.

The delay of delay element 60 becomes important in the PAL operating modes as illustrated in FIG. 3. This figure shows the third circuit path 404 that couples the chrominance signal to the chrominance input of chroma processor 18 in the PAL mode. As shown, the composite video signal at terminal 38 is coupled via the chrominance bandpass filter 70 and the transcoder 80 and the mode switch 62 to the input 50 of the picture processor 10. The delay of this path is designated Td-5. By selecting the delay of the composite video signal path (first path, 202) Td-1 to equal Td-5, the luminance and chrominance components will both be equally delayed in reaching their respective inputs of the picture processor 10 in the PAL mode. Once this delay is established the delays for the luminance and chrominance components will be the same for any input video signal format without the need for switching of the luminance component when changing from NTSC to PAL or vice versa.

Figure 5:
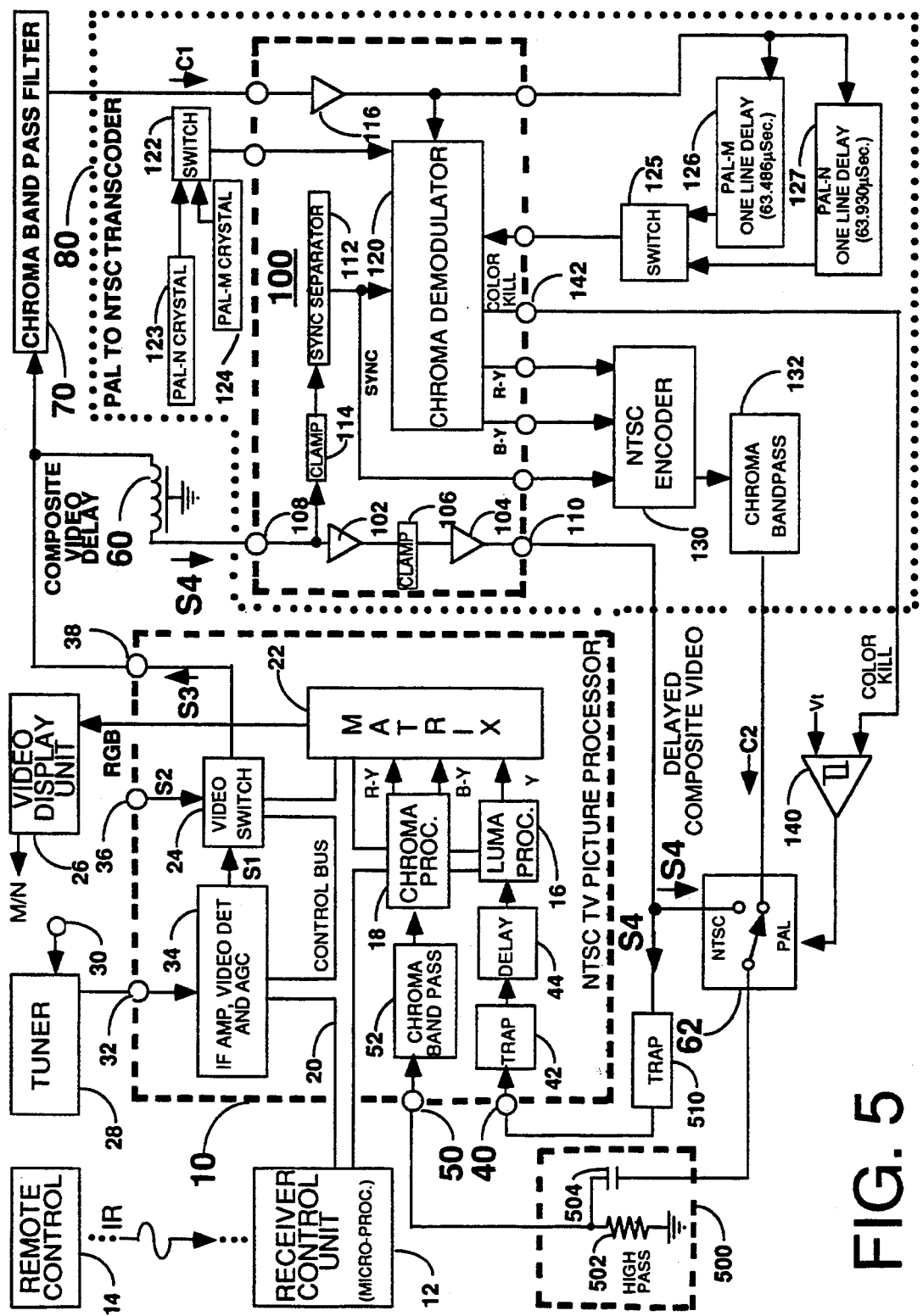
FIG. 5 is a block diagram, partially in schematic form, illustrating certain modifications to the multi-standard receiver of FIG. 1.

FIG. 5 illustrates two modifications of the receiver of FIG. 1 for improving transient response and luma/chroma isolation. Specifically, it has been found that for the particular picture processor used relatively large luminance signal transients tend to overdrive the chrominance band pass filter 52 in processor 10. Also, for the particular picture processor used, additional luma/chroma isolation would be desirable over that afforded by filters 42 and 52 provided in the integrated circuit. The difficulty, insofar as multi-mode reception is concerned, is to provide improved isolation and transient response without compromising the delay characteristics of the luminance and chrominance signal processing paths. One can not, for example, solve the chrominance transient problem by merely bandpass filtering the chrominance signal without introducing a substantial amount of uncompensated delay in the chrominance signal channel.

The solution to the above problems, in accordance with a feature of the FIG. 5 embodiment, is to insert a high pass 500 filter in the chrominance signal path at a point between the output of switch 62 and the chrominance input 50 of processor 10 and to insert a chrominance trap or "notch" filter 510 at the luminance input 40 of processor 10. The filter comprises a series capacitor 504 coupled between switch 62 and terminal 50 and a shunt resistor 502 coupled between terminal 50 and ground. The reason for using a high pass filter for the chrominance signal, rather than a band pass filter, is that the high pass filter exhibits relatively negligible delay. What little delay is introduced is balanced by the placement of the added trap filter 510 in the luminance path.

The trap or notch depth of filter 510, illustratively, is relatively modest since the luminance signal is subjected to filtering within the picture processor. As an example, in one implementation of the receiver, it was found that the luminance chrominance isolation of the picture processor used was on the order of about 20 dB. A relatively "shallow" trap depth of 5 dB yielded a net isolation of 25 dB and was found to be adequate to suppress any visual artifacts from the luminance chrominance cross talk effect. It will be noted that excessive chrominance attenuation in the luminance signal path may introduce excessive delay relative to the chrominance signal resulting in temporal miss-registration. What is needed is a "moderate" notch depth, as noted above which is supplementary to that provided by trap 42 to minimize the visibility of crosstalk without introducing significant delay.

FIGS. 6, 7 and 8 illustrate the effect of the time delays in the three principal circuit paths 202, 303 and 404 previously discussed. As before, time delay Td-2 is set substantially equal to Td-4 by adjustment of delay 44 in picture processor 10. The delays of trap 510 in the first circuit path and high pass filter 500 in the second and third circuit paths is negligible for the reasons previously mentioned (i.e., the trap is of modest depth and the filter 500 is of the high pass RC type as opposed to a band pass type). Accordingly, for all practical purposes the time delays Td-1, Td-3 and Td-5 are equal thereby ensuring that the luminance and chrominance components are equally delayed upon presentation to input terminals 40 and 50 of the picture processor 10. Further, it will be noted that the inclusion of the crosstalk suppression filter 510 in the luminance path and the luminance transient suppression filter 500 in the chrominance path does not interfere with the desired topology of the overall system of avoiding switching of the luminance signal when changing from one operating mode to another.

Figure 9:
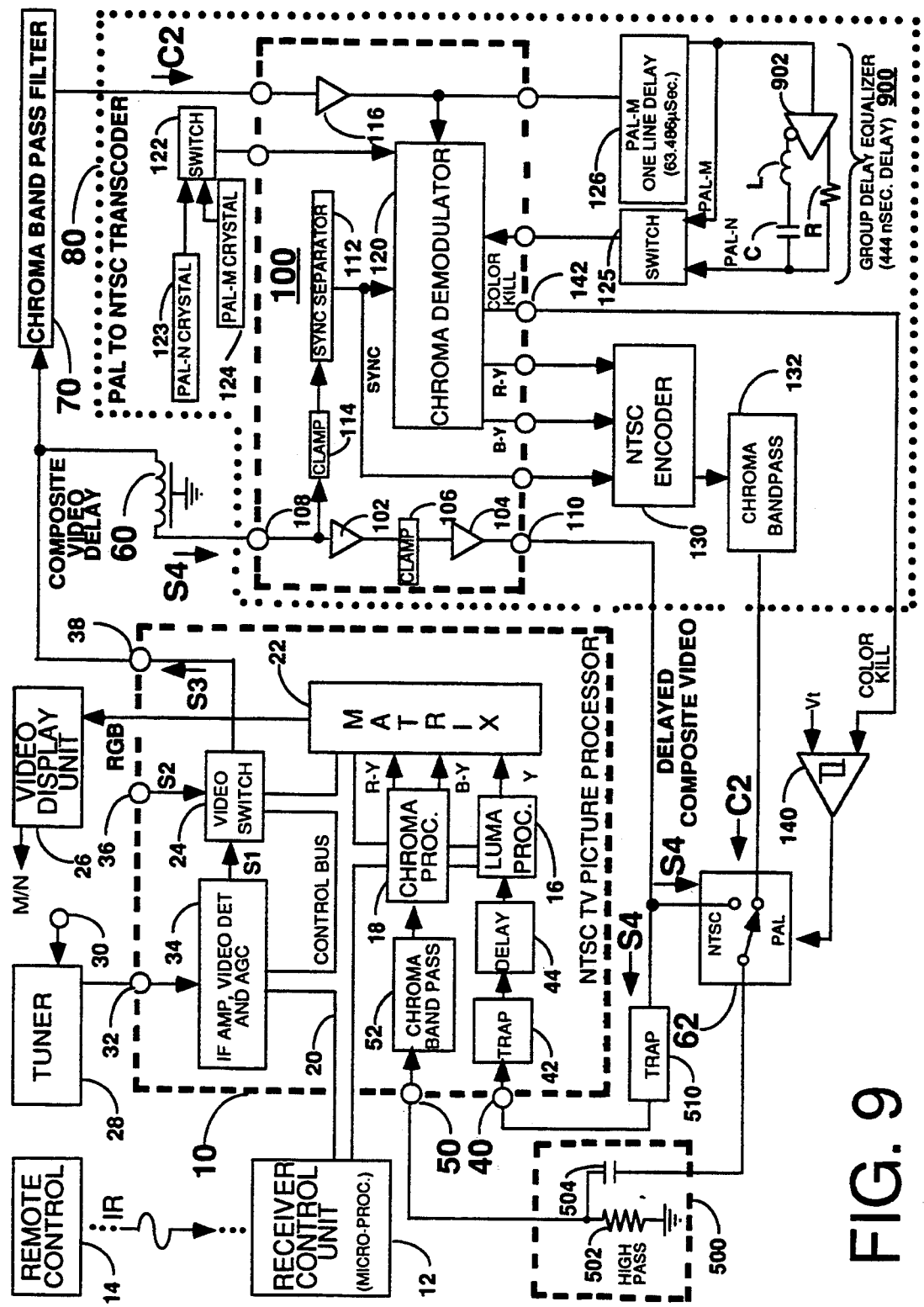
FIG. 9 is a block diagram, partially in schematic form, illustrating a modification of the multi-standard receiver of FIG. 5.

FIG. 9 illustrates a modification of the receiver of FIG. 5 for reducing the cost and improving the reliability of the color transcoding. Specifically, in FIG. 9 the PAL-N delay line 127 formerly in transcoder 80 has been removed and replaced by a group delay equalizer 900 having a delay of 444 nano-seconds. The input of the equalizer is coupled to receive the PAL-N signal and the output of the equalizer is coupled to provide the resultant PAL-M signal to the 1-H delay line switch 125. Recall that the period of one line in the PAL-M standard is very close to that of one line in the PAL-N standard. Recall also that for purposes of the present invention, all that is transcoded is the chrominance signal. Thus it is possible, in the receiver of the present invention to replace the PAL-M 1-H delay line with a group delay equalizer tuned to the subcarrier frequency and adjusted for a net delay equal to the difference in the PAL M and N standards (e.g., 444 nano-seconds).

The equalizer 900 comprises an amplifier 902 having an input coupled to receive the chrominance signal C2 and having inverting (signified by a "o") and non-inverting outputs. The amplifier 902 may comprise, illustratively, a bipolar or field effect transistor, For bipolar transistors the input would be the base, the inverting output would be taken from the collector load resistor and the non-inverting output would be taken from the emitter resistor. The corresponding electrodes if a field effect transistor is used would be the gate, drain and source. The non-inverting output of amplifier 902 is coupled via a resistor R to the input of switch 125. This resistor determines the magnitude of the delay equalization applied to the chrominance signal C2. The inverting output of amplifier 902 is coupled to the input of switch 125 by means of a series connection of an inductor L and a capacitor C. These elements determine the frequency at which group delay is a maximum are tuned to the desired frequency where a delay peak is needed. In this application, they are tuned to the PAL color subcarrier frequency because it is only the color component of the PAL signals which are being processed in the transcoder. Accordingly, for this application one may avoid the need for multiple delay lines by providing incremental delays by a group delay equalizer as shown.

What is claimed is:

1. A television receiver, comprising a picture processor having respective inputs for receiving luminance and chrominance input signals of a first transmission format and having an output for providing a processed signal for display, the receiver including source providing a received composite video signal of said first transmission format or a second transmission format, a transcoder for converting the color component of a received composite video signal of the second transmission format to the first transmission format and a switching system for enabling the transcoder for received signals of the second format and for bypassing the transcoder for received signals of the first format;
   wherein: for providing delay compensation of said luminance and chrominance input signals said switching system comprises:
   a first circuit path (202) for applying the received composite video signal to the luminance input (40) of the picture processor (10) via a composite video signal delay unit (60) for received signals of both of said transmission formats;
   a second circuit path (303) for applying the received composite video signal to the chrominance input (50) of the picture processor (10) via the composite video signal delay unit (60) and a chrominance signal selection switch (62) when the received signal is of the first standard transmission format; and
   a third circuit path (404) for applying the received composite video signal to the chrominance input (50) of the picture processor via a chrominance signal transmissive filter (70), a chrominance signal transcoder (80) and the chrominance signal selection switch (62) when the received signal is of said second standard transmission format.

2. A television receiver, as recited in claim 1, further comprising:
   a first filter means (500) coupled between an output of said switch (62) and said chrominance input (50) of said picture processor (10) for attenuating luminance components of the composite video signal applied to said chrominance input of said picture processor via said second circuit path; and
   a second filter means (510) coupled between an output of said composite video signal delay unit (60) and said luminance input (40) of said picture processor (10) for attenuating chrominance components of the composite video signal applied to said luminance input of said picture processor.

3. A television receiver, as recited in claim 1, further comprising circuit means (102, 104, 106) coupled in said first circuit path (202) between said composite video signal delay unit (60) and said luminance input (40) of said picture processor (10) for amplifying and clamping said delayed composite video signal.

4. A television receiver, as recited in claim 1, wherein:
   said second transmission format comprises a PAL format including PAL-M standard signals and PAL-N standard signals; and.
   said transcoder (80) includes a demodulator (100) operable for both PAL standards.

5. A television receiver, as recited in claim 4 wherein said transcoder (80) further includes a delay circuit (126, 900, 125) providing one line delayed PAL-M and PAL-N input signals for said demodulator(100); and wherein
   said delay circuit comprises a PAL-M line delay unit (126) having an output coupled to a group delay equalizer (900) and a switch (125) for selecting the output of the delay circuit for demodulation of said PAL-M standard signals for selecting the output of the group delay equalizer for demodulation of said PAL-N standard signals.

6. A method for providing delay compensation in a multistandard television receiver for received signals of a first standard transmission format and a second standard transmission format, said receiver including a picture processor having respective inputs for receiving luminance and chrominance input signals of said first transmission format and having an output for providing a processed signal for display, said receiver including a transcoder for converting the color component of received signals of said second format to said first format and a switching system for enabling said transcoder for received signals of said second format and for bypassing the transcoder for received signals of said first format; and
   wherein, to avoid subjecting the luminance signal to varying delay when changing between received signals of said first and second formats, said method comprises:
   applying the received composite video signal to the luminance input of the picture processor via a first circuit path comprising a composite video signal delay unit for received signals of both of said standard transmission formats;
   applying the received composite video signal to the chrominance input of the picture processor via a second circuit path including the composite video signal delay unit and a chrominance signal selection switch when the received signal is of said first standard transmission format; and
   applying the received composite video signal to the chrominance input of the picture processor via a third circuit path including a chrominance signal transmissive filter, a chrominance signal transcoder and the chrominance signal selection switch when the received signal is of said second standard transmission format; and
   providing a delay for said video signal delay unit so as to provide equal signal delays in said first, second and third circuit paths.

7. A method, as recited in claim 6, further comprising:
   inserting a first filter means (500) between an output of said switch (62) and said chrominance input (50) of said picture processor (10) for attenuating luminance components of the composite video signal applied to said chrominance input of said picture processor via said second circuit path; and
   inserting a second filter means (510) between an output of said composite video signal delay unit (60) and said luminance input (40) of said picture processor (10) for attenuating chrominance components of the composite video signal applied to said luminance input of said picture processor.

8. A method, as recited in claim 6, further comprising:
   inserting circuit means (102, 104, 106) coupled in said first circuit path (202) between said composite video signal delay unit (60) and said luminance input (40) of said picture processor (10) for amplifying and clamping said delayed composite video signal.

9. A method, as recited in claim 6, further comprising:
   applying control signals to said chrominance signal transcoder in said third circuit path for conditioning said transcoder for operation with PAL-M and PAL-N standard signals.

10. A method, as recited in claim 9, further comprising:
   providing a decoding delay for said transcoder in said third circuit path by selecting an output of a PAL-M line delay unit when PAL-M standard signals are received and
   applying group delay equalization to the output of said PAL-M delay unit when PAL-N standard signals are received.

* * * * *